(12) United States Patent
Rosthal et al.

(10) Patent No.: US 8,332,191 B2
(45) Date of Patent: Dec. 11, 2012

(54) CORRECTION FACTORS FOR ELECTROMAGNETIC MEASUREMENTS MADE THROUGH CONDUCTIVE MATERIAL

(75) Inventors: Richard A. Rosthal, Richmond, CA (US); Hong Zhang, El Sobrante, CA (US); Cyrille Levesque, La Defense (FR); Guozhong Gao, Watertown, MA (US); H. Frank Morrison, Berkeley, CA (US); David Alumbaugh, Berkeley, CA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 252 days.

(21) Appl. No.: 12/641,994

(22) Filed: Dec. 18, 2009

(65) Prior Publication Data

US 2011/0012620 A1 Jan. 20, 2011

Related U.S. Application Data

(60) Provisional application No. 61/225,255, filed on Jul. 14, 2009.

(51) Int. Cl.
*G06F 17/50* (2006.01)
*G06F 7/60* (2006.01)
*G06G 7/48* (2006.01)
*G01F 3/00* (2006.01)
*G01V 1/40* (2006.01)
*G01V 3/08* (2006.01)

(52) U.S. Cl. ............ 703/2; 703/1; 703/6; 703/10; 702/6; 324/329; 324/338; 324/339; 324/368

(58) Field of Classification Search ................... 703/1, 2, 703/6, 10; 324/329, 338, 339, 368; 702/6
See application file for complete search history.

(56) References Cited

U.S. PATENT DOCUMENTS

| | | | | |
|---|---|---|---|---|
| 5,103,181 A | * | 4/1992 | Gaisford et al. | 324/637 |
| 5,402,068 A | * | 3/1995 | Meador et al. | 324/338 |
| 5,811,973 A | * | 9/1998 | Meyer, Jr. | 324/338 |
| 5,869,968 A | * | 2/1999 | Brooks et al. | 324/338 |

(Continued)

FOREIGN PATENT DOCUMENTS

WO WO2009158189 12/2009

OTHER PUBLICATIONS

Xiang, Dong. "Analysis and Experimental Investigation of a Modular Differential Dielectric Sensor (DDS) for use in Multiphase Separation, Process Measurement, and Control", 2007.*

(Continued)

*Primary Examiner* — Shambhavi Patel
(74) *Attorney, Agent, or Firm* — Jeremy Berman; Darla Fonseca

(57) ABSTRACT

The present disclosure relates to determining attenuation factors relating to an electromagnetic signal passing through, a conductive material seen by a real sensor. A sensor is provided and disposed proximate to the material. An alternating current is passed through the sensor and the impedance of the sensor is measured. The impedance of an ideal coil is obtained from the measured impedance using electromagnetic modeling combined with a circuit analysis of the coil impedance, and the attenuation factors for the real coil in straight or feedback mode are determined by electromagnetic modeling of casing attenuation factors and impedance of an ideal coil combined with equivalent circuit modeling of the sensor transfer functions. The attenuation factors seen by the real sensor may be determined in real-time or post-survey. The material may be magnetic or non-magnetic.

25 Claims, 12 Drawing Sheets

U.S. PATENT DOCUMENTS

| | | | | |
|---|---|---|---|---|
| 5,886,255 | A * | 3/1999 | Aronstam | 73/152.01 |
| 5,900,733 | A * | 5/1999 | Wu et al. | 324/338 |
| 6,060,884 | A * | 5/2000 | Meyer et al. | 324/341 |
| 6,294,917 | B1 * | 9/2001 | Nichols | 324/339 |
| 6,393,363 | B1 * | 5/2002 | Wilt et al. | 702/6 |
| 6,534,986 | B2 * | 3/2003 | Nichols | 324/339 |
| 6,597,178 | B1 * | 7/2003 | Nichols et al. | 324/339 |
| 6,614,229 | B1 * | 9/2003 | Clark et al. | 324/338 |
| 6,677,891 | B2 * | 1/2004 | Fehrenbach et al. | 342/124 |
| 6,724,191 | B1 * | 4/2004 | Larsen | 324/329 |
| 6,765,385 | B2 * | 7/2004 | Sinclair et al. | 324/338 |
| 6,765,387 | B2 * | 7/2004 | Prammer | 324/368 |
| 6,791,330 | B2 * | 9/2004 | McCormick | 324/338 |
| 6,961,663 | B2 * | 11/2005 | Sinclair et al. | 702/6 |
| 7,030,617 | B2 * | 4/2006 | Conti | 324/339 |
| 7,049,821 | B2 * | 5/2006 | Haber et al. | 324/339 |
| 7,059,428 | B2 * | 6/2006 | Frey et al. | 175/50 |
| 7,095,232 | B2 * | 8/2006 | Haber et al. | 324/368 |
| 7,665,544 | B2 * | 2/2010 | Forgang et al. | 175/50 |
| 7,681,647 | B2 * | 3/2010 | Mudunuri et al. | 166/302 |
| 7,795,872 | B2 * | 9/2010 | Clark et al. | 324/338 |
| 2009/0091328 | A1 * | 4/2009 | Clark et al. | 324/338 |
| 2009/0281731 | A1 * | 11/2009 | Morrison et al. | 702/7 |
| 2010/0097066 | A1 * | 4/2010 | Gao | 324/339 |
| 2010/0231221 | A1 * | 9/2010 | Rosthal et al. | 324/339 |

OTHER PUBLICATIONS

"Understanding the Transmission Line Theory", 2001.*

Soulier et al. "E.M. MWD Data Transmission Status and Perspectives", 1993.*

Spies, B.R. et al., Sensitivity analysis of crosswell electromagnetics, Geophysics, vol. 60, No. 3, pp. 834-845.

Alumbaugh, David L. et al., Theoretical and practical considerations for crosswell electromagnetic tomorgraphy assuming a cylindrical geometry, Geophysics, vol. 60, No. 3, 1995, pp. 846-870.

Wilt, M.J. et al., Crosswell electromagnetic tomography: system design considerations and field results, Geophysics, vol. 60, No. 3, 1995, pp. 871-885.

Depavia, Luis et al., Next generation cross-well EM imaging tool, SPE 116344, Denver, CO, Sep. 21-24, 2008.

* cited by examiner

CORRECTION FACTORS FOR ELECTROMAGNETIC MEASUREMENTS MADE THROUGH CONDUCTIVE MATERIAL

CROSS-REFERENCE TO OTHER APPLICATIONS

This application claims priority to and the benefit of U.S. Provisional Application No. 61/225,255, filed provisionally on Jul. 14, 2009.

TECHNICAL FIELD

The present application relates generally to the field of electromagnetic logging, and particularly to electromagnetic logging in the presence of conductive material.

BACKGROUND

In the oil industry, electromagnetic (EM) induction surveys are used to map the electrical conductivity of geologic formations between boreholes and/or radially away from a single wellbore. The latter, usually referred to as induction logging, has been in routine use for over fifty years. Those surveys are performed in open holes; that is, holes that have not been lined with a (typically, metal) casing.

Recently, the concepts of induction logging have been extended to surveys between uncased wells and between wells cased with conductive liners. There is also interest in the use of logging between surface and downhole sensors, and within single wells that are cased with conductive liners. The conductive liners (casing) introduce several problems. For example, the signal from the transmitter to the receiver is severely attenuated upon passing through the conductive casing because of the casing's high conductivity and, usually, high magnetic permeability (high-mu or high-$\mu$). The conductivity, permeability, and thickness of the casing wall can vary along the length of the casing. Transmitters in these surveys are normally multi-turn solenoids that have a core of high magnetic permeability. At high current levels in the solenoid, the permeability of the core material, and of the surrounding casing itself, is driven into a nonlinear regime. Under those circumstances, the current in the solenoid is not proportional to the net radiated field. Receivers may also use high-mu, cored solenoids, but because they never operate at the high field levels in which such nonlinear effects are seen, this is not a problem for them, in practice. However, receiver coils have many more turns than transmitter coils, and the large winding stray capacitance combined with large coil inductance can produce a resonant peak within the frequency range of operation. This should be accounted for when relating the measured impedance to that of an ideal inductor or the actual casing attenuation factors to those of an ideal inductor.

The various types of induction surveys typically share many commonalities. A transmitter, usually a multi-turn coil of wire, carries an alternating current of frequency $\omega$ (radians/sec). This creates a time-varying magnetic field in the surrounding formation that in turn, by Faraday's law, induces an electromotive force (emf). This emf drives currents in the formation that are basically proportional to the formation conductivity. Finally, a receiver is positioned either in the same hole as the transmitter, in another hole, or on the surface (land or seafloor), and measures the magnetic field arising from the transmitter and the secondary or induced currents in the formation. Conventional induction logging always uses a combination of multiple receivers and/or multiple transmitters connected in series so as to cancel the mutual signal in air.

In general, a theoretical model for a logging system embedded in a formation of arbitrary resistivity is used to match or interpret the received signals. In some applications, the absolute value of the average formation resistivity is not as important as the ability to map variations of resistivity within the formation. To determine this spatial variation of formation resistivity, the surveys typically involve placing the transmitter at multiple locations in the hole and measuring the fields at multiple receiver locations for each transmitter location. In crosshole surveys, this yields a data set similar to those obtained from tomography.

There is a "window" of frequencies in which such surveys are practical. Below a certain frequency, the secondary fields from the formation are simply too small relative to the primary coupling between the transmitter and receiver to be measured accurately with practical receivers. Above a certain frequency, the casing attenuation obliterates the formation response. The frequency window depends greatly on the type of casing used. Carbon steel casing generally has a conductivity ($\sigma$) of approximately five million S/m and a relative permeability ($\mu_r$) of approximately 100. Chromium casing is essentially non-magnetic ($\mu_r$ is equal to or close to 1), and has a conductivity of approximately one million S/m. As a result, chromium casing is preferable because it attenuates the EM signal much less than the carbon steel casing, at the same frequency. Thus, for practical field systems in chromium cased boreholes, this window can be up to several hundred Hz, while in carbon steel cased boreholes, the frequency is limited to roughly one hundred Hz and below.

Recall, however, that even in those frequency windows, the casing properties (i.e., conductivity ($\sigma$), relative permeability ($\mu_r$), thickness (t), and inner/outer diameter) are not constant along the length of casing. Since the casing attenuation is so strong, small variations in the casing's properties produce variations in the fields seen by a receiver that are large compared to the variations expected from desired formation variations. A further problem is that the strength of the transmitter, known as its effective moment, must be known so that moment variations are not misinterpreted as variations in the formation conductivity.

The inhomogenieties of well casing alluded to above make it challenging to remove the casing imprints on EM data to get high resolution inversion images. Some previously attempted methods related to casing imprints removal are software-based methods, while others are measurement-based. Some measurement-based prior art methods involve using numerical modeling codes to calculate casing attenuation factors and coil impedance as functions of parameter(s) related to casing properties and frequency, and then using measured coil impedance at given frequencies to interpolate for corresponding casing attenuation factors. Alternatively, one can build up a look-up table and then search for the corresponding conductive casing attenuation factor for the measured impedance at given frequencies.

The above casing correction methods are based on the assumption that the casing effects and formation effects are separable, which was concluded from studies assuming the use of point-dipole transmitters and receivers in steel casing. However, due to the fairly large size of cross-well transmitter and receiver coils, experiments in steel casing at a surface test facility have shown that the point-dipole model fails at distances less than about 300 ft away from the casing when casing collar or casing centralizers are present in the vicinity of the induction coil disposed inside the casing. A proposed solution to this problem for a transmitter in chromium casing is to use only the receiver data (as a function of transmitter depth) when the transmitter is in relatively uniform sections of the casing, thereby eliminating the effect of casing collars and centralizers. An alternative proposed solution to this same problem for receivers in conductive casing is to identify casing collars and casing centralizers using a receiver casing coupling identification (CCID) log (a receiver depth log of trans-impedance between the receiver feedback winding and the main winding) to avoid placing receiver stations near casing collars and casing centralizers during a survey.

The induction coil used for crosswell, surface-to-borehole, and single-well applications has at least two modes of operation: (1) straight (ST) mode; and (2) feedback (FB) mode. Straight mode operation measures the voltage of the main winding wound on a high magnetic permeability core. It has a resonance peak due to winding stray capacitance within a desired frequency range. Feedback mode is when the main winding voltage is connected to the feedback winding through a feedback circuit, which results in a flat frequency response within a desired frequency range. For ST mode, an equivalent circuit model relates measured coil impedance in casing to modeled impedance of an ideal inductor using numerical modeling. For induction coils in FB mode, there are several ways to implementing feedback circuit. For example, one type of feedback circuit was used on low-frequency induction magnetometers having relatively small dimensions for space research. FB mode in air is not particularly sensitive to environmental parameters such as temperature and pressure, and it has larger signal to noise in steel casing compared to ST mode. On the other hand, certain impedance methods relate the impedance of the main winding to ST mode casing attenuation factors. Experimental and modeling studies have shown that a receiver in FB mode is less attenuated by conductive casing compared to a receiver in ST mode, and the FB casing attenuation factors can be obtained from ST mode casing factors.

SUMMARY

The present disclosure relates to determining attenuation factors relating to an electromagnetic signal passing through a conductive material seen by a real coil, either in Feedback mode or in Straight mode. A sensor is provided and disposed proximate to the material. An alternating current is passed through the sensor and the impedance of the sensor is measured. "Corrected impedance" is then obtained from the measured impedance by taking out the winding stray capacitance and wire resistance. The impedance and the attenuation factors of an ideal antenna disposed, for example, in casing are modeled using electromagnetic (EM) modeling code. Using circuit analysis, the ideal impedance and attenuation factors are related to the measured impedance and attenuation factors of the true sensor and circuit. The corrected impedance is compared to the predicted impedance to determine the casing parameters or the casing attenuation factors for the real sensor. The attenuation factors may be determined in real-time or post-survey. The material may be magnetic or non-magnetic.

BRIEF DESCRIPTION OF THE FIGURES

FIG. 4B shows the impedance of the coil main winding; FIG. 4C shows the circuit impedance in straight mode; and FIG. 4D shows the circuit impedance in feedback mode.

Figure 1:
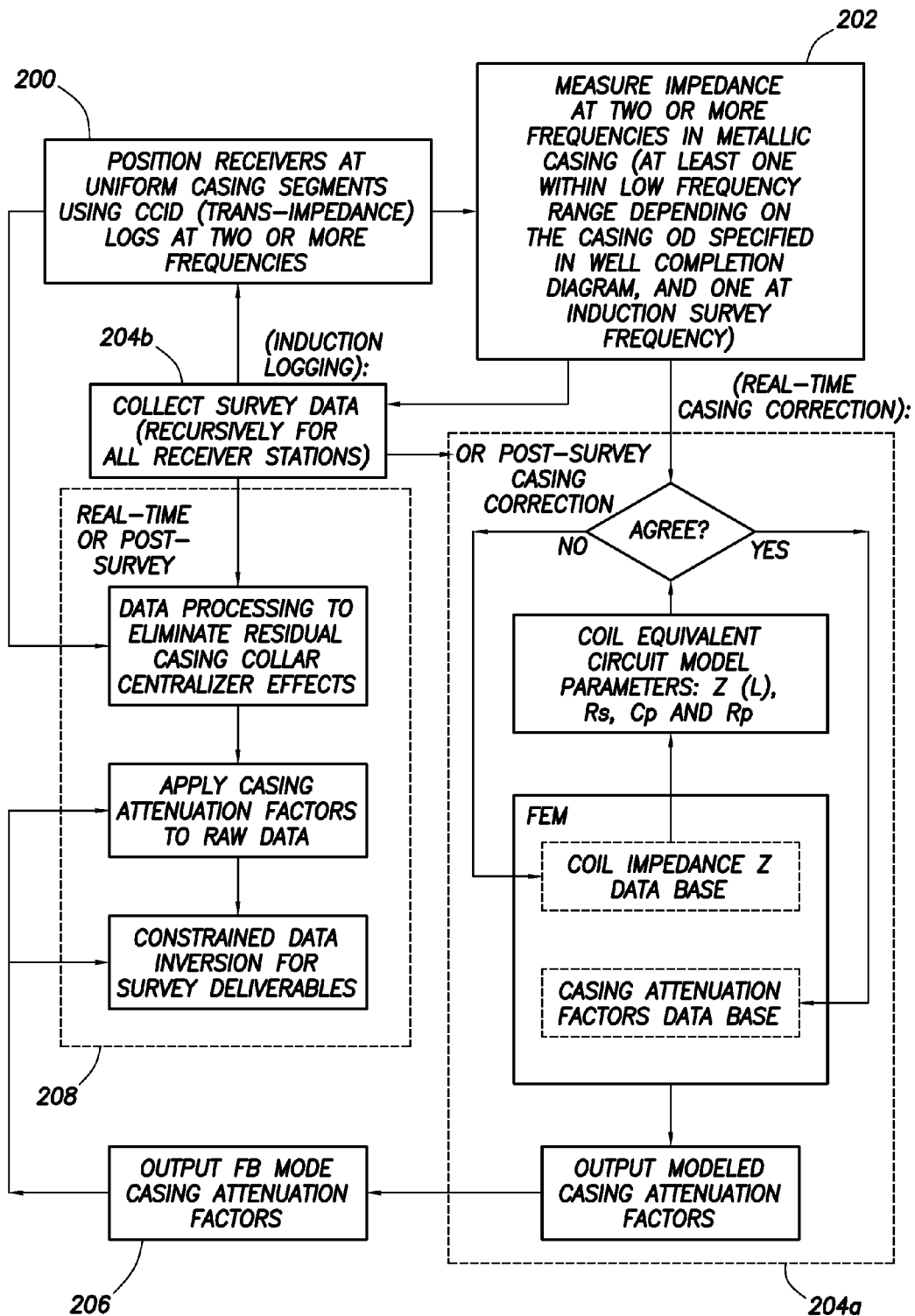
FIG. 1 is a flowchart showing, for one embodiment, the steps of data collection and real-time and/or post-survey casing correction for data processing and inversion.

It is to be understood that the drawings are to be used for the purpose of illustration only, and not to limit the scope of the appended claims.

DETAILED DESCRIPTION

Specific embodiments will now be described with reference to the figures. Like elements in the various figures will be referenced with like numbers for consistency. In the following description, numerous details are set forth to provide an understanding of the present disclosure. However, it will be understood by those skilled in the art that the present invention may be practiced without many of these details and that numerous variations or modifications from the described embodiments are possible.

The present disclosure applies, for example, to cross-borehole (or crosswell) logging, surface-to-borehole logging, or in-hole logging by electromagnetic means when the holes are cased with conductive casing. Image results of such logging can be improved by eliminating or correcting for the variable attenuation of fields transmitted or received through casing that has inherent variations in electric conductivity, magnetic permeability, and wall thickness. To correct for casing attenuation when an EM signal propagates through conductive casing, measurements can be made on a solenoid (coil) having a high magnetically permeable core to predict the casing attenuation factor. With magnetic steel casing, because of the introduction of magnetic permeability in the casing, the physics is more complicated than that for non-magnetic casing.

Various embodiments may be used to determine the casing parameters and casing attenuation in conductive casing using single or multiple frequency impedance measurements. In general, the impedance (or transimpedance) of a perfect (i.e., ideal) sensor and the casing effect of a perfect sensor can be compared to the measured impedance (or transimpedance) of a real sensor and the casing effect of the real sensor. Since the influence of the equivalent circuit of the real sensor is taken into account, the casing effect on a receiver in two modes, referred to herein as "straight" and "feedback" modes, can be obtained. Two fundamental physical properties can be modeled using numerical EM modeling code: (1) the impedance (or transimpedance) of a perfect sensor; and (2) the casing effect on the perfect sensor. Those two idealized quantities relate to the measured impedance (or transimpedance) and to the measured casing effect. This relationship depends upon the physical properties of the coil and upon the measurement circuit. Both the measured sensor impedance and the casing attenuation factors depend not only upon the construction of the sensor and the properties of the casing, but also upon the electrical properties of the sensor and of the measurement circuits. By using numerical modeling and equivalent circuit modeling, the casing corrections for a real sensor and its detection circuit can be derived. The casing corrections can be obtained in real-time while performing crosswell, surface-to-borehole, and single-well induction loggings.

FIG. 1 is a flowchart showing, for one embodiment, the steps of data collection and real-time and/or post-survey casing correction for data processing and inversion. The processes enclosed in the dashed boxes can be done either in real-time for each receiver station, or during post-survey processing for all receiver stations within depths of interest. In step 200, a receiver casing collar/centralizer identification (CCID) log is used to position the receivers in a tool string in relatively uniform sections of casing, thereby avoiding casing collars and casing centralizers. If the casing collars and centralizers are so close to each other that one or more receivers will be unavoidably affected by a collar or centralizer, those receiver stations can be identified and their data eliminated or otherwise delineated as uncorrectable. The CCID log measures the transimpedance between the feedback winding and the main winding of an induction sensor as a receiver depth log. The CCID log can be used, for example, for quality control of main survey data. The log allows one to identify and eliminate residual casing collar/centralizer effects in such data in real-time and/or post survey data processing. It can also be used to set constraints for data inversion.

In step 202, the main winding impedance is measured at desired frequencies, with at least one frequency in the low frequency range. That may be, for example, between 1 and 2 Hz for 7" OD (outer diameter) magnetic steel casing. At least one measurement is also made at the crosswell (or surface-to-borehole, or single well) main survey frequency range. The actual low frequency range depends on the OD of the casing. For non-magnetic casing (e.g., Cr steel casing), one frequency at the induction survey frequency is sufficient. The transimpedance measurement might also provide the same information as the main winding impedance measurement, and can be used as an alternative measurement type.

In step 204a, the main survey is performed at the current receiver station. For real-time processing, the modeled casing attenuation factors calculation is performed, which uses the measured impedance and/or transimpedance in casing combined with the equivalent circuit model to relate modeled impedance to measured impedance in casing. The modeled (estimated) casing attenuation factors are output. The determination of the detailed casing correction depends, for example, on the well casing type, casing OD, and the main induction survey frequency. For customary induction logging, the data is collected recursively for each receiver station (step 204b).

In step 206, the FB mode casing attenuation factor are obtained from the modeled casing attenuation factors. Step 206 uses the relationship between the modeled casing attenuation factors and the actual casing attenuation factors, as described below. The feedback mode casing attenuation factors are applied to the raw induction survey data to get "open-hole-look-alike" data, or used as further constraints for data inversion (step 208). The above steps are repeated until the main survey is completed for all receiver stations. The calculation of the casing attenuation factors described in steps 204 and 206 can also be used in post-survey data processing and/or the inversion stage for the complete survey data set.

Most oil field conductive casing segments are about 30 ft. to 40 ft. long, and, in most casing, only one casing centralizer is installed per casing segment. In rare cases, two casing centralizers per segment may be used. Those configurations allow most of the receiver stations to be placed so as to avoid casing collars and casing centralizers during a downhole survey, with only a few receiver stations being affected by the collars and centralizers that should be removed from the survey data set.

A receiver in FB mode tends to provide better performance for induction surveys in conductive casing, at least in terms of temperature/pressure stability and in noise performance. The effect of casing on a receiver in FB mode is different from that on a receiver in ST mode. Casing attenuation factors for an induction coil in FB mode may be obtained from impedance measurements made on the coil main winding while the coil is disposed in conductive casing. Measurements of the transimpedance between the feedback winding and main winding might also be used in lieu of the main winding impedance measurements.

Figure 2:
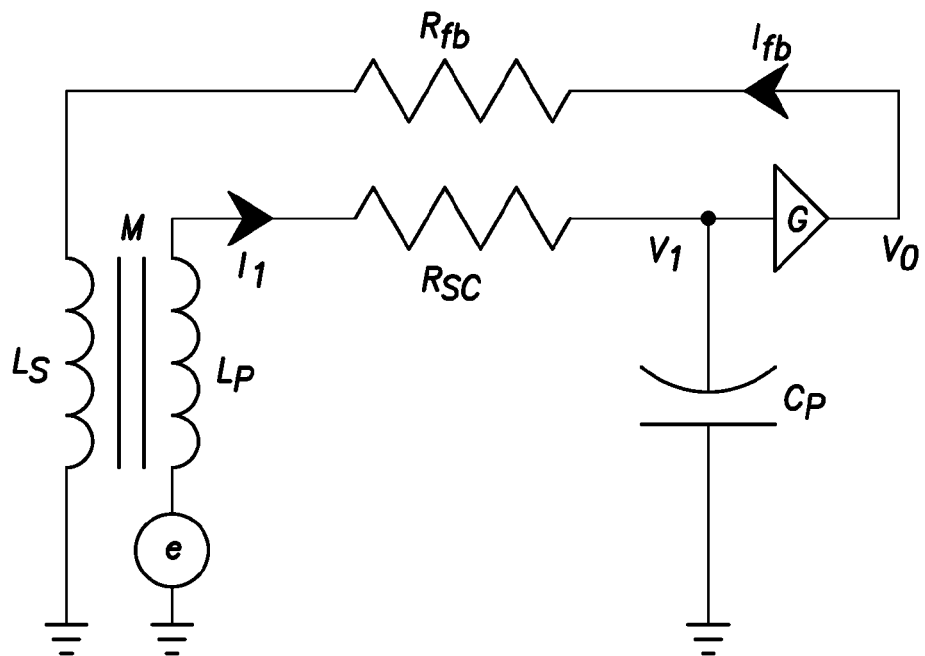
FIG. 2 shows an equivalent circuit that can be used to calculate a transfer function for one embodiment of an induction sensor in feedback mode in air/vacuum, and having a magnetic core, a main winding, and a feedback winding.

FIG. 2 shows an equivalent circuit that can be used to calculate a transfer function for an induction sensor in air/vacuum, and having a magnetic core, a main winding, and a feedback winding. In the circuit shown on the left side of FIG. 2, e represents the emf (electromotive force) induced in the circuit by an external magnetic field. It is equal to $$-A_{\mathit{eff}}\frac{\partial B}{\partial t}=-i\omega B_0,$$

where $A_{\mathit{eff}}$ is the effective area of the sensor and $B_0$ is the magnitude of the external field. The external magnetic field is assumed to have a time dependence of $e^{i\omega t}$. If there is no feedback, then one may consider $R_{fb}=\infty$, or equivalently, set M=0. Assuming the input impedance of the amplifier is infinite, there is no current into the amplifier. In that case, the coil with inductance $L_P$, the series resistance $R_{SC}$, and the capacitance $C_P$ determine the current $I_1$.

Using simplified notations L, $R_S$ and C for coil inductance $L_P$, series resistance $R_{SC}$, and the capacitance $C_P$, the total input impedance of this leg is:

$$Z=R_S+i\omega L-\frac{i}{\omega C}. \tag{1}$$

Thus $$I_1=\frac{e}{R_S+i\omega L-\frac{i}{\omega C}} \tag{2}$$
$$=\frac{ei\omega C}{1+i\omega R_S C-\omega^2 LC}$$

and $$V_1 = I_1\left(\frac{-i}{\omega C}\right) \quad (3)$$
$$= \frac{e}{1 + i\omega R_s C - \omega^2 LC}$$
$$V_0 = \frac{eG}{1 + i\omega R_s C - \omega^2 LC}$$

Those are the equations in straight mode. They show the effect of the parallel capacitance in creating a resonance at a frequency $\omega=1/\sqrt{LC}$, and also the effect of the series resistance in damping the resonance.

When one adds the feedback, it introduces an additional voltage into the coil that is equal to:

$$-iI_{fb}\omega M = -i\frac{V_1}{R_{fb}}\omega M = -i\frac{GV_0}{R_{fb}}\omega M \quad (4)$$

Then we have $$e' = e - \frac{i\omega GMCV_1}{R_{fb}} \quad (5)$$

and $$V_1 = \frac{e}{1 + i\omega\left(R_s C + \frac{GM}{R_{fb}}\right) - \omega^2 LC} \quad (6)$$

$$V_0 = \frac{-i\omega B_0 A_{eff} G}{1 + i\omega\left(R_s C + \frac{GM}{R_{fb}}\right) - \omega^2 LC}$$

The above assumes that the voltages introduced on the feedback coil by its self-impedance ($i\omega I_{fb}L_{fb}$) and by its mutual impedance from the main coil ($i\omega MI_1$) is much smaller than the voltage drop across the feedback resistor ($I_{fb}R_{fb}$). In general, $$\frac{GM}{R_{fb}} >> R_s C_p.$$

Thus, for the region in which the middle term in the denominator is dominant, we have, approximately:

$$\frac{V_0}{B_0} = -\frac{A_{eff} R_{fb}}{M} \quad (7)$$

This will be true for the frequency range:

$$1 < \frac{\omega GM}{R_{fb}} > \omega^2 LC \quad (8)$$
$$\omega > \frac{R_{fb}}{GM}$$

and $$\omega > \frac{GM}{R_{fb}LC}$$

Within that frequency range, the response of the feedback circuit is nearly flat. Thus, for the transfer function in equation (7), if a property of the core changes, then the factors $A_{eff}$ and M will tend to increase or decrease in the same way since they are both proportional to $\mu_{apparent}$, the apparent permeability of the core. Thus, the total response will not change.

Experiments have shown that for the transfer function in straight mode, there is a significant change in the response of the sensor with respect to temperature and pressure variation, but in feedback mode there is very little.

Figure 3:
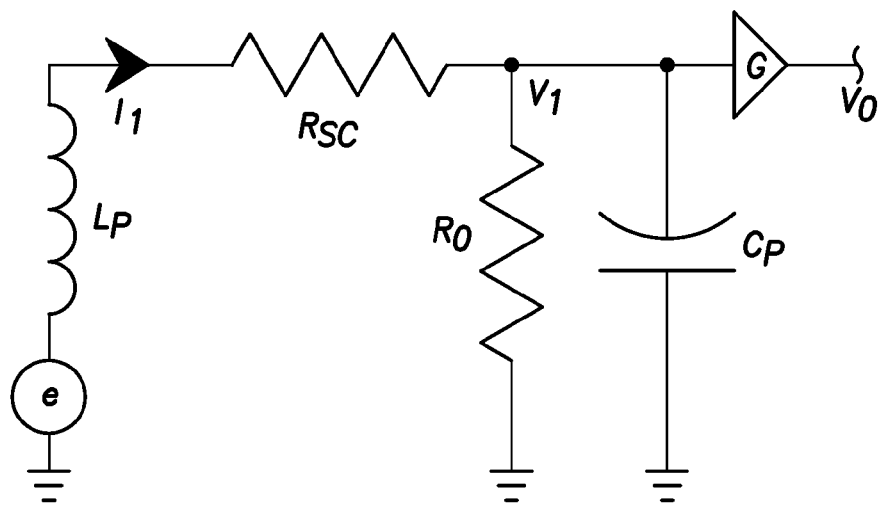
FIG. 3 shows an equivalent circuit model for another embodiment of an induction sensor in feedback mode.

According to the prior art, a damping resistor placed in parallel to the coil would have the same effect as the flux feedback on the frequency response. Such a damping resistor, however, would significantly contribute to the noise level at the resonance frequency. However, that is not the case if the damping resistor $R_D$ is added in parallel with the capacitor, as shown in FIG. 3. The impedance of the circuit is:

$$Z = R_S + i\omega L + \left(\frac{1}{\frac{1}{R_D} + i\omega C}\right) \quad (1')$$

Similarly, $$I_1 = \frac{e\left(\frac{1}{R_D} + i\omega C\right)}{1 + \frac{R_S}{R_D} + i\omega\left(R_s C + \frac{L}{R_D}\right) - \omega^2 LC} \quad (2')$$

$$V_1 = \frac{e}{1 + \frac{R_S}{R_D} + i\omega\left(R_s C + \frac{L}{R_D}\right) - \omega^2 LC}$$

$$V_0 = \frac{-i\omega B_0 A_{eff} G}{1 + \frac{R_S}{R_D} + i\omega\left(R_s C + \frac{L}{R_D}\right) - \omega^2 LC} \quad (3')$$

Comparing equation (3') with equation (3) reveals that the response with the damping resistor is identical to that with the feedback so long as:

$$R_D = R_{fb}\frac{GM}{L} \quad (9)$$

Figure 4A:
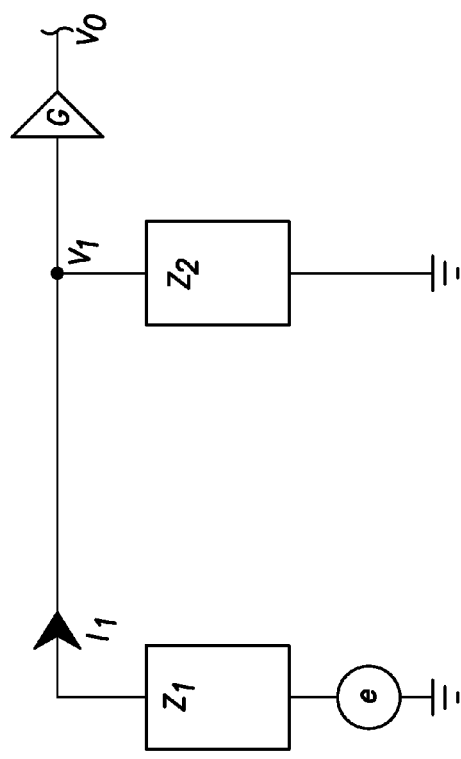
FIGS. 4A, 4B, 4C, and 4D show a general equivalent circuit model for an embodiment of an induction sensor in either straight or feedback mode.
Figure 4D:
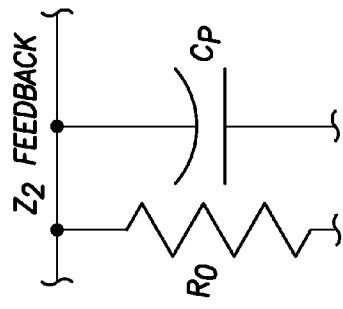
Figure 4C:
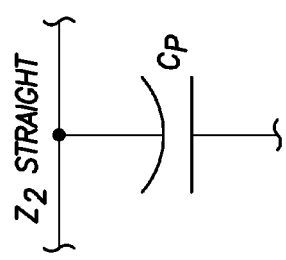
Figure 4B:
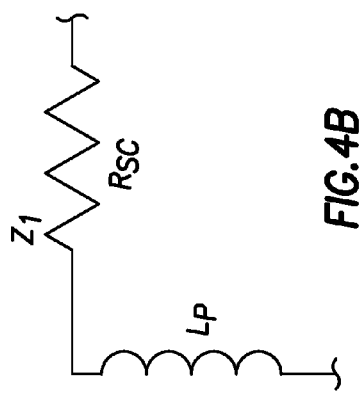

FIGS. 4A-4D shows a generalized equivalent circuit model for a sensor. They apply for either the straight mode (FIG. 4C) or the feedback mode (FIG. 4D), depending on the details of circuit impedance $Z_2$. $Z_1$ represents the inductive and resistive part of the coil main winding impedance, without the stray capacitance. If one considers this as a voltage divider, the voltage $V_1$ is related to the induced emf e by a voltage divider between $Z_1$ and $Z_2$, as illustrated in the circuit of FIG. 4A. Viewed in this way, the only difference between the straight and feedback modes is that, in feedback mode, the impedance $Z_2$ is smaller because it includes the damping resistor. As a voltage divider, one gets:

$$V_0 = eG\frac{Z_2}{Z_1 + Z_2}.$$

If the circuit impedance is dominant ($Z_2 \gg Z_1$), then $V_0 \approx eG$. This approximates the circuit in straight mode with a perfect sensor, that is, one in which there is no parallel capacitance and no additional circuit elements. This should be true for either straight or feedback mode at low frequency since in the limit of low frequency, $Z_1 \Rightarrow 0$. In the opposite case, for which the sensor impedance is dominant ($Z_1 \gg Z_2$), then, $$V_0 \approx eG\frac{Z_2}{Z_1}.$$

In air, both e and $Z_1$ are proportional to the apparent permeability of the core. Thus, the quotient $e/Z_1$ has no dependence on the core, to first order. This can be useful, since magnetic materials have properties that are difficult to control and depend upon temperature, pressure, and the history of the core. Experiments have shown that the response of a receiver in straight mode is much more dependent on the temperature and pressure than one operating in feedback mode. It can also be seen why there is less casing effect in feedback mode than in straight mode. The raw voltage, e, decreases when the sensor is put in casing. The impedance of the sensor also decreases. In feedback mode, the decreased impedance of the coil partially compensates for the decrease in voltage.

When the receiver is placed in conductive casing, the equivalent circuit model for the receiver transfer function shown in FIGS. 4A-4D still holds, except that the inductive and resistive part of the coil impedance in air ($Z_1$) is replaced by the coil impedance in casing. As stated previously, the casing effect is different for straight mode and feedback mode. In addition, the casing effect in feedback mode can be altered by changing the value of the feedback resistor.

No relationship has previously been derived to relate the casing effect in feedback mode and the casing effect in straight mode. The measured impedance of the receiver inside casing does not agree with the calculated value, but good agreement can be obtained if one includes the parasitic capacitance, parallel resistance, and series resistance of the coil. The series resistance can be measured directly, and the parallel capacitance and parallel resistance can be determined by fitting the impedance versus frequency data in air.

For the circuits shown in FIG. 3, the casing effect can be computed from the above formulas by making the following substitutions:

$$e \rightarrow e_{CASING}$$

$$i\omega L \rightarrow Z_{CASING} \quad (10)$$

where $e_{CASING}$ is the voltage for a perfect coil in casing, and $Z_{CASING}$ is the input impedance of a perfect coil in casing. These are the basic physics properties of the sensor. Everything else is simply the effect of imperfections or the equivalent circuit of a real coil including winding resistance, winding stray capacitance, and core losses. These quantities can be calculated as open circuit responses using a numerical modeling code. Note that since the primary and secondary coils are wound together and tightly coupled, the relationship $M/L = N_{fb}/N_P$ still holds and it does not matter whether one thinks of this as a feedback circuit or as a circuit with a damping resistor.

By doing this one may obtain: (1) the relationship between the measured input impedance and the calculated impedance in casing for a perfect sensor; (2) the casing effect for a straight mode receiver, including the parasitic parameters; (3) the casing effect for a feedback mode receiver; and (4) the casing effect that would occur for any other parameter values of the feedback circuit. Note that in all these cases, the parasitic parameters of the sensor will play an important role.

The observed casing effect in straight and feedback modes are given by substituting from equation (10) into equation (3'), with $R_D = \infty$ corresponding to straight mode. This gives the following results for the casing factor $$\kappa = \frac{V_{0\_Casing}}{V_{0\_Air}};$$

$$K_{Straight} = \frac{e_{casing}}{e_{Air}} \frac{1 + i\omega(R_S C) - \omega^2 L_{Air} C}{1 + i\omega(R_S C) - \omega^2 Z_{Casing} C} \quad (11)$$

$$K_{Feedback} = \frac{e_{casing}}{e_{Air}} \frac{1 + \frac{R_S}{R_D} + i\omega\left(R_S C + \frac{L_{Air}}{R_D}\right) - \omega^2 L_{Air} C}{1 + \frac{R_S}{R_D} + i\omega(R_S C) + \frac{Z_{Casing}}{R_D} - \omega^2 Z_{Casing} C} \quad (12)$$

Equations (11) and (12) relate the measured (or actual) casing effect κ with the modeled casing effect $$\frac{e_{casing}}{e_{Air}}$$

for straight and feedback modes, respectively. The equivalent circuit parameters in the above two equations, $R_S$, C, and $L_{Air}$ can be obtained through measurement of the coil impedance in air prior to a survey and data fitting using an impedance equivalent circuit model. $Z_{Casing}$ is the modeled impedance of a perfect coil in casing.

$$R_D = R_{fb}\frac{GM_{Air}}{L_{Air}}$$

can be calculated from the feedback resistor value $R_{fb}$, the gain G in the feedback circuit, the modeled mutual inductance $M_{Air}$ between the feedback winding and the main winding, and the self inductance $L_{Air}$ of the main winding as perfect coils in air using numerical modeling code. The casing factors are in general complex, meaning both the magnitude and the phase of the signal can be and typically are altered by the casing.

Figure 7A:
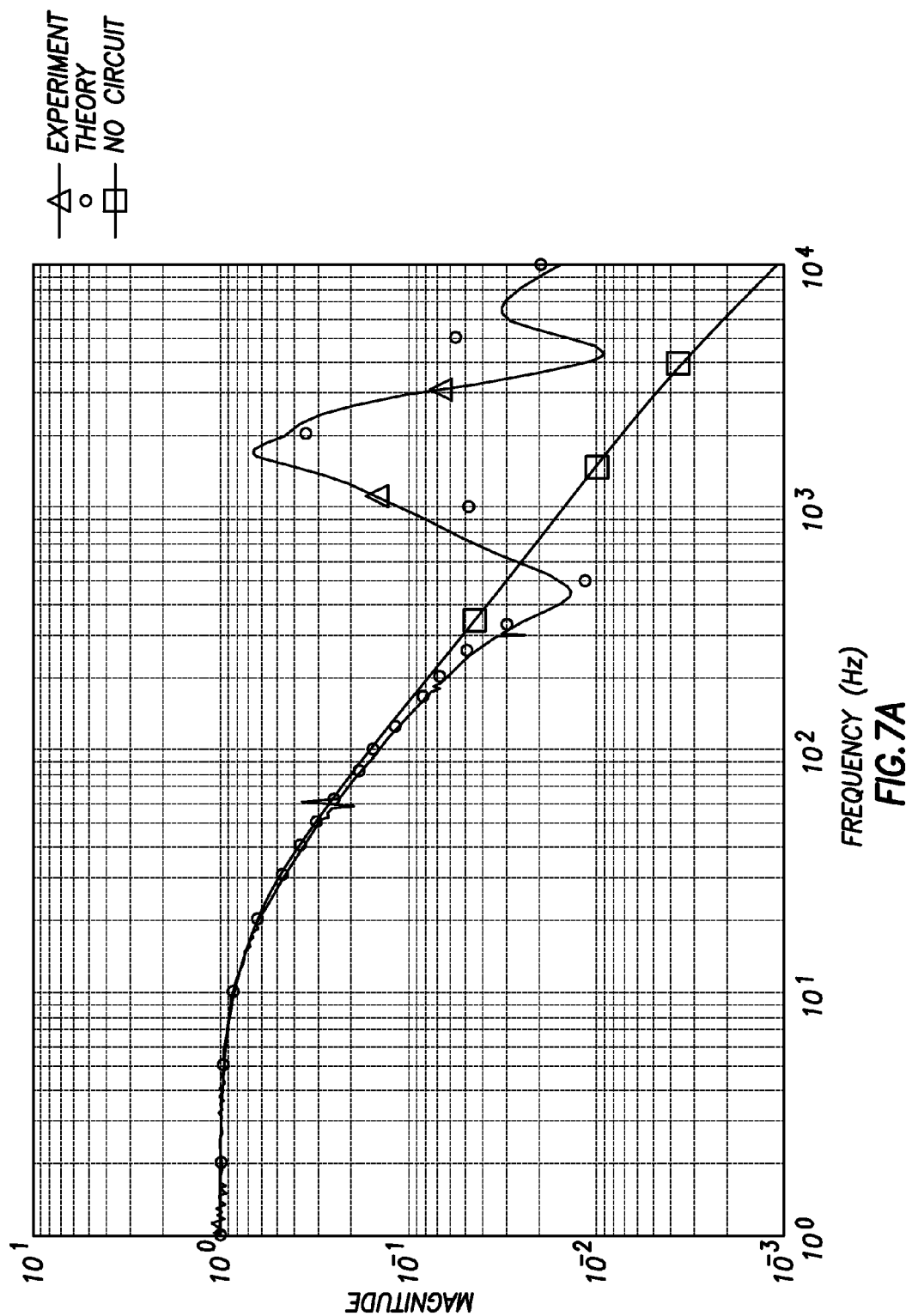
FIGS. 7A and 7B are exemplary graphs in which the measured and modeled casing attenuation factors are plotted for the straight mode as a function of frequency for chromium casing, FIG. 7A corresponding to the amplitude, and FIG. 7B corresponding to the phase.
Figure 7B:
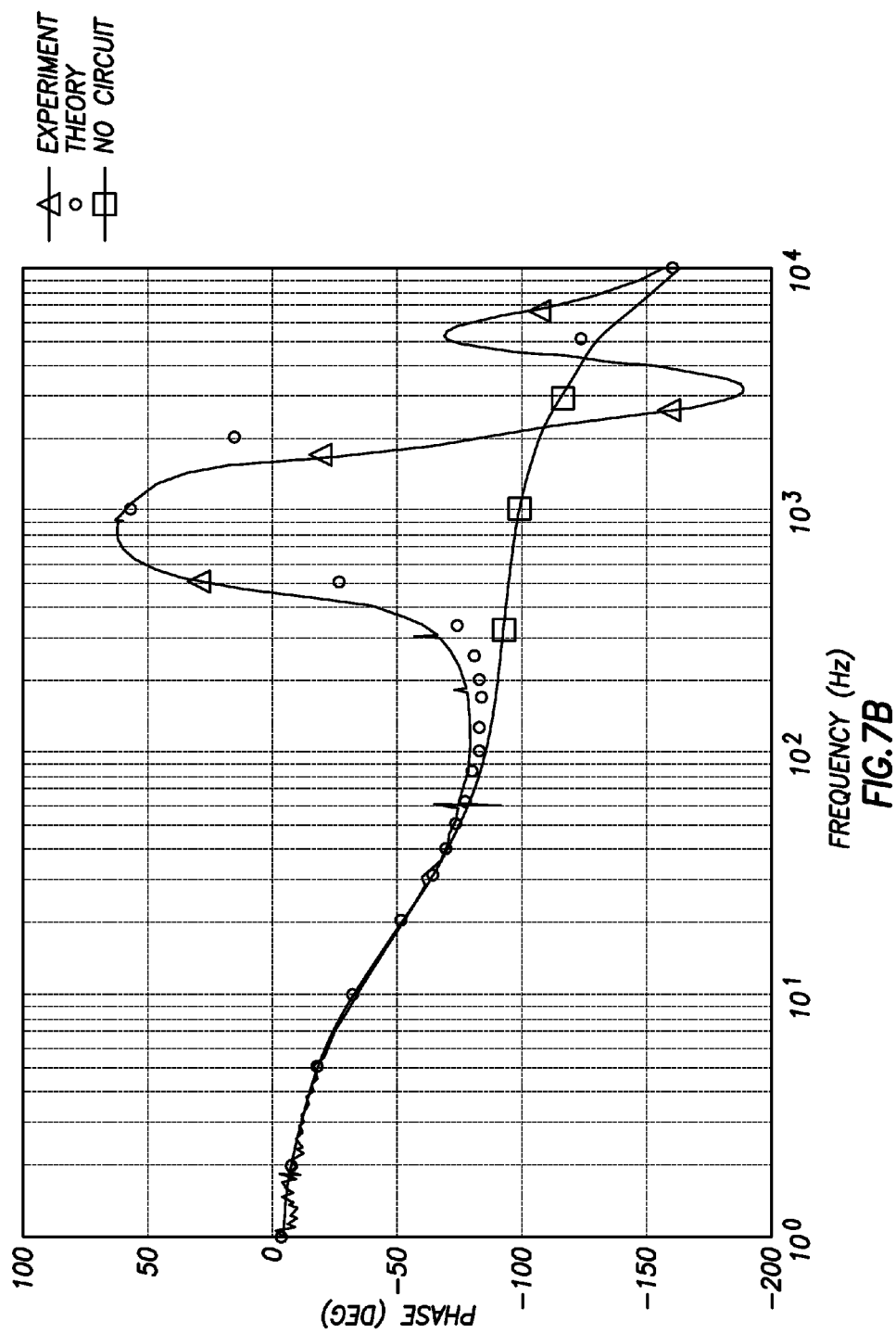
Figure 8A:
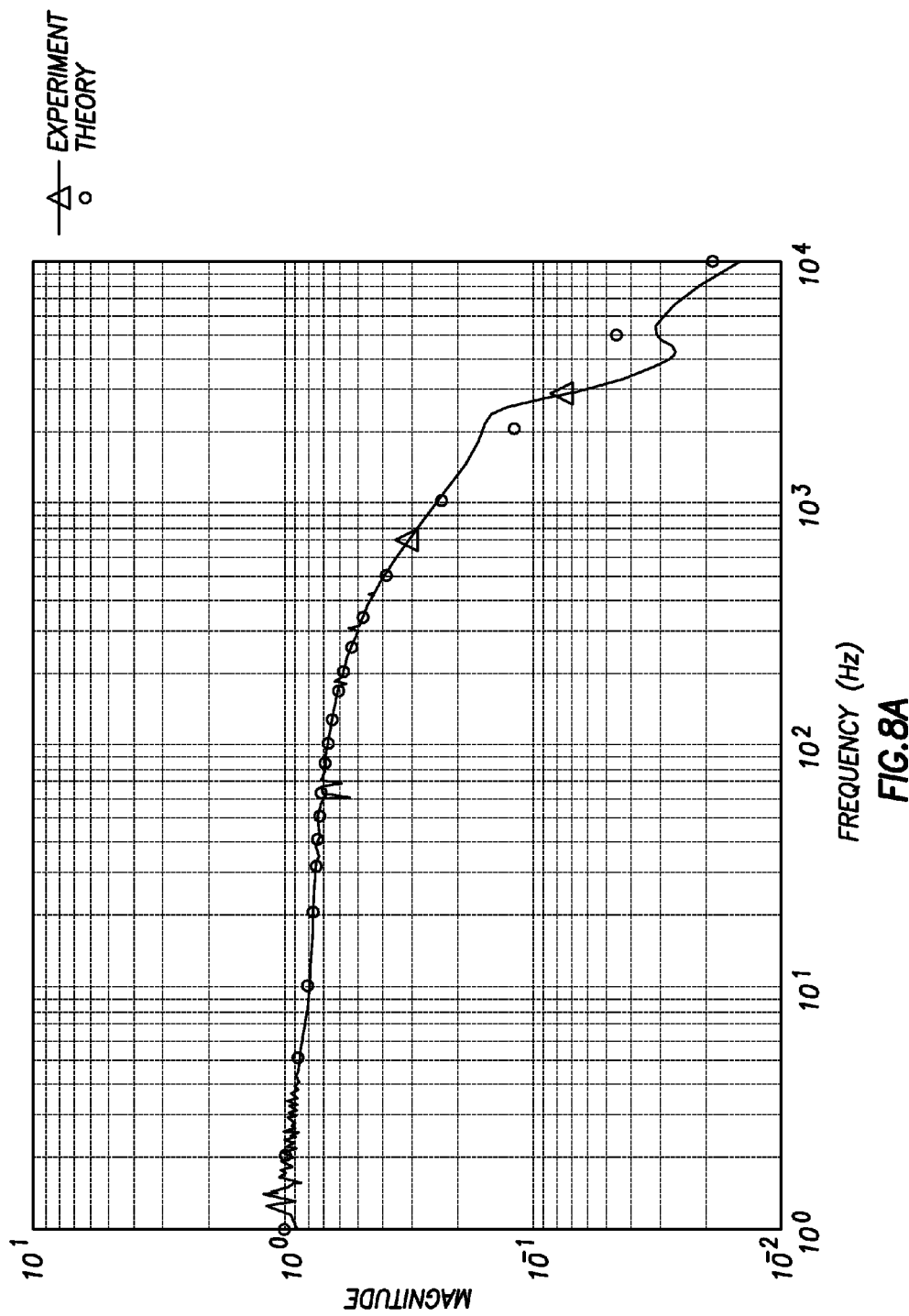
FIGS. 8A and 8B are exemplary graphs in which the measured and modeled casing attenuation factors are plotted for the feedback mode as a function of frequency for chromium casing, FIG. 8A corresponding to the amplitude, and FIG. 8B corresponding to the phase.
Figure 8B:
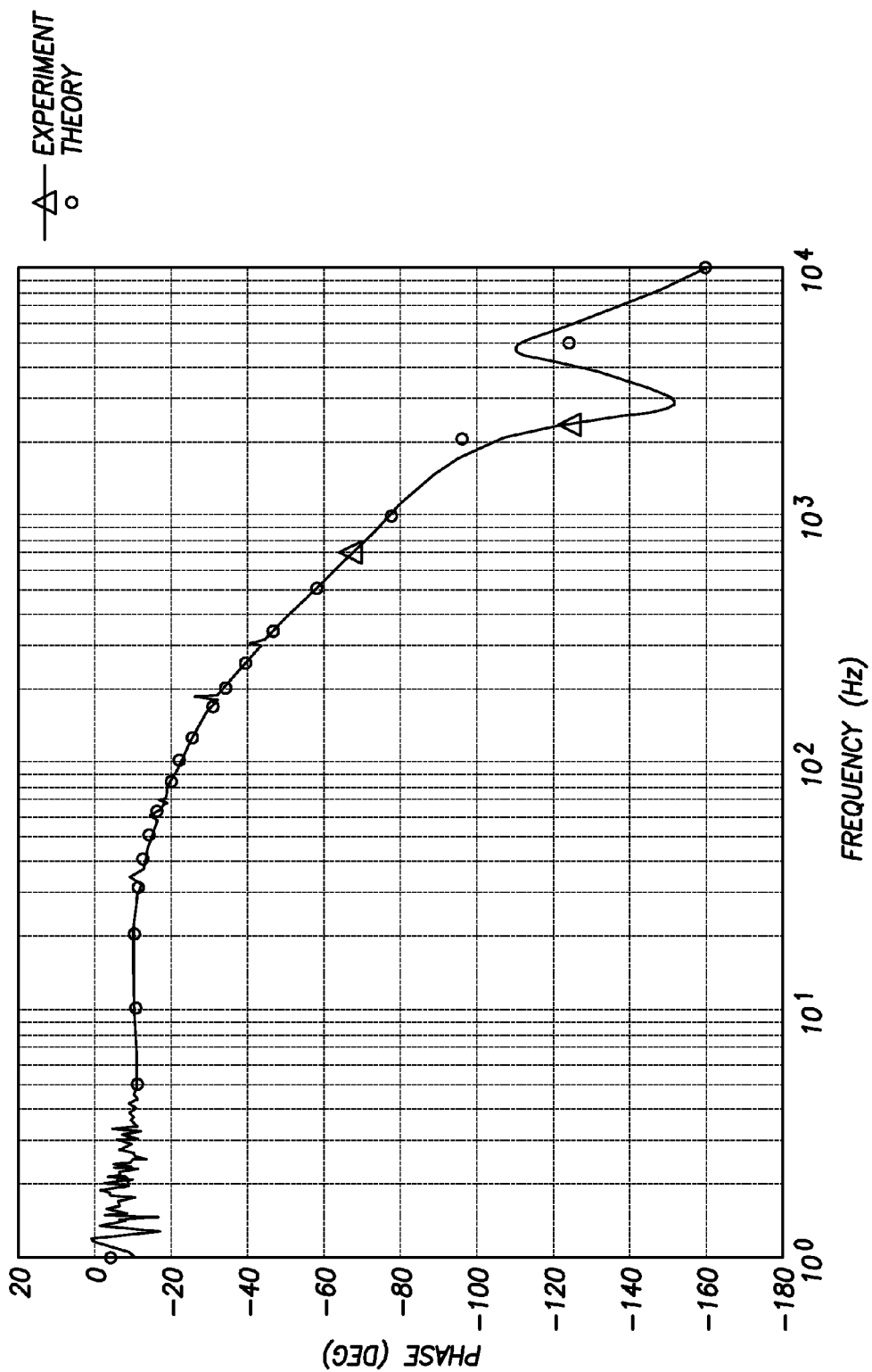

FIGS. 7 and 8 show measurements of the casing effects for two modes of receiver operation, straight and feedback, and also from two types of casing, non-magnetic chromium steel casing ("chromium casing") and normal magnetic carbon steel ("steel casing"). The electrical conductivity of the chromium casing is approximately $1.0 \times 10^6$ S/m, while the steel casing is about $4.3 \times 10^6$ S/m. In addition, the steel casing is magnetic with a typical magnetic permeability in the range of 50 to 150. A magnetic permeability of 100 was assumed for the above modeling study. The magnetic permeability, μ, may vary both longitudinally and radially along the casing. In addition, it may also be a function of the frequency and the magnetic field strength. In general, μ is not well known for different types of steel casings.

Because of its higher conductivity and higher permeability, steel casing is far more attenuating than chromium casing. This is because the skin depth $$\delta = \sqrt{\frac{2}{\omega\mu\sigma}}$$

is approximately twenty times smaller in steel casing than in chromium casing. For the parameters used herein, the skin depth of the chromium casing is $\delta_{chromium}(100\text{ Hz})=1.9815$ cm, while that of the steel casing is $\delta_{steel}(100\text{ Hz})=0.0967$ cm. For the casings used herein, both the chromium and steel casings are about 1 cm thick. Thus the chromium casing is only half a skin depth thick, while the steel casing is ten skin depths thick.

The modeling results were obtained using a numerical modeling code, equations (11) and/or (12), and a known response of a high-pass filter. The high-pass filter was placed on the analog signal conditioning circuit after the feedback circuit. This configuration is specific to the sensor used for the experiments. Other sensors may or may not use such a configuration. FIG. 7 shows the comparison of the magnitude and phase for the straight mode casing attenuation factor for the receiver in chromium casing, and FIG. 8 shows the comparison in feedback mode in chromium casing.

In all these figures, the curve with triangles is the experimental data, the curve with squares is the modeled results without any circuit, and the circles are the modeled data with the circuit. The model has captured all of the significant features of the casing effect. Even in straight mode, there is a significant effect from the circuit at higher frequency. The shape and size of this effect is captured well by the model.

Once again, there is excellent agreement between theory and experiment. The disagreement in the region near 4 kHz corresponds to the secondary resonance of the coil, which was not included in the model. One would typically operate far below this resonance frequency, so it should not be an issue.

In the case of chromium casing, the frequency is limited to a maximum frequency of about 200 Hz. The bump in FIGS. 7 near 1 kHz can be understood as being caused by the movement of the resonance frequency upward inside the casing, though it is perhaps inaccurate to call it a resonance since it is so broad.

Figure 9A:
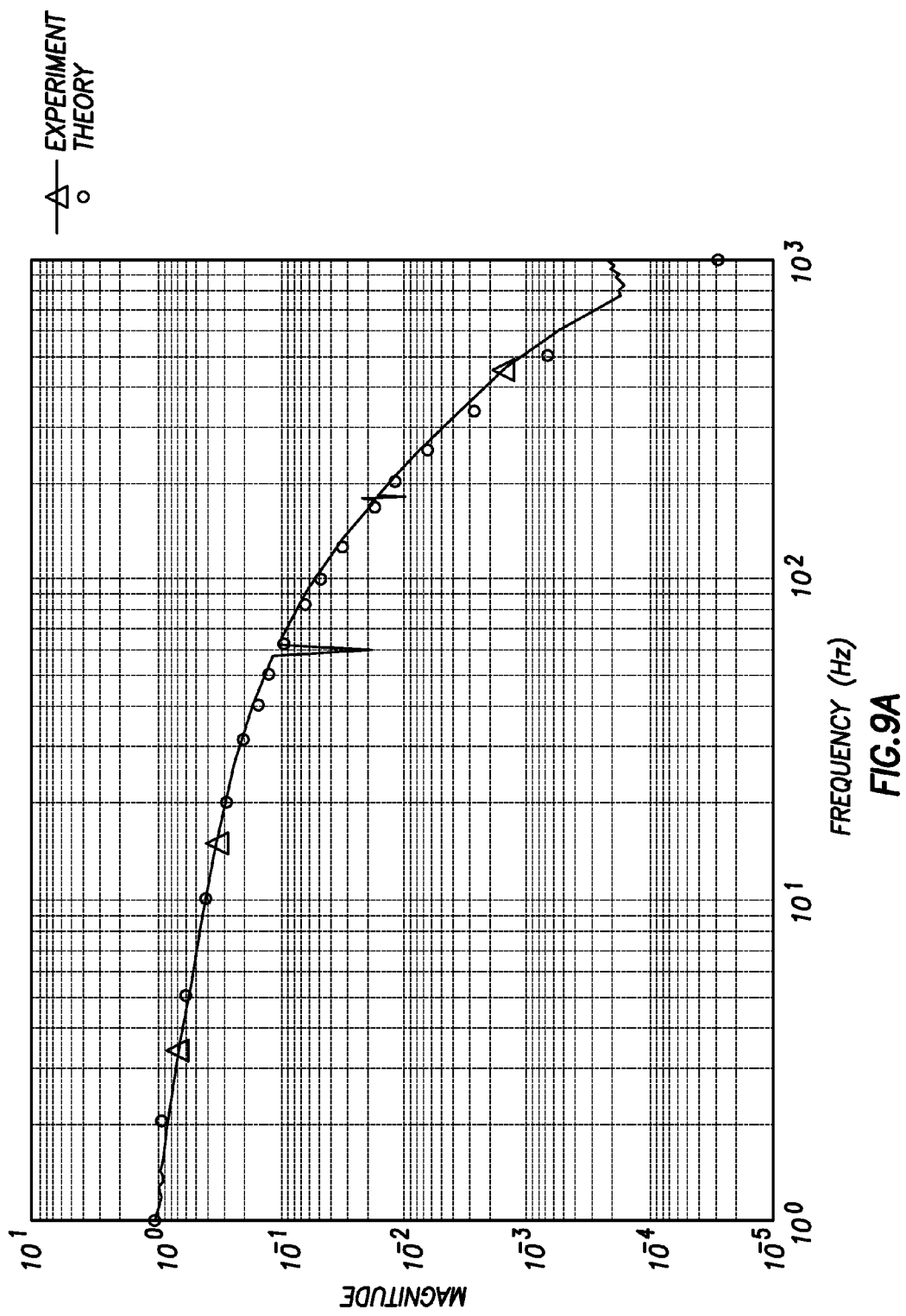
FIGS. 9A and 9B are exemplary graphs in which the measured and modeled casing attenuation factors are plotted for the straight mode as a function of frequency for steel casing, FIG. 9A corresponding to the amplitude, and FIG. 9B corresponding to the phase.
Figure 9B:
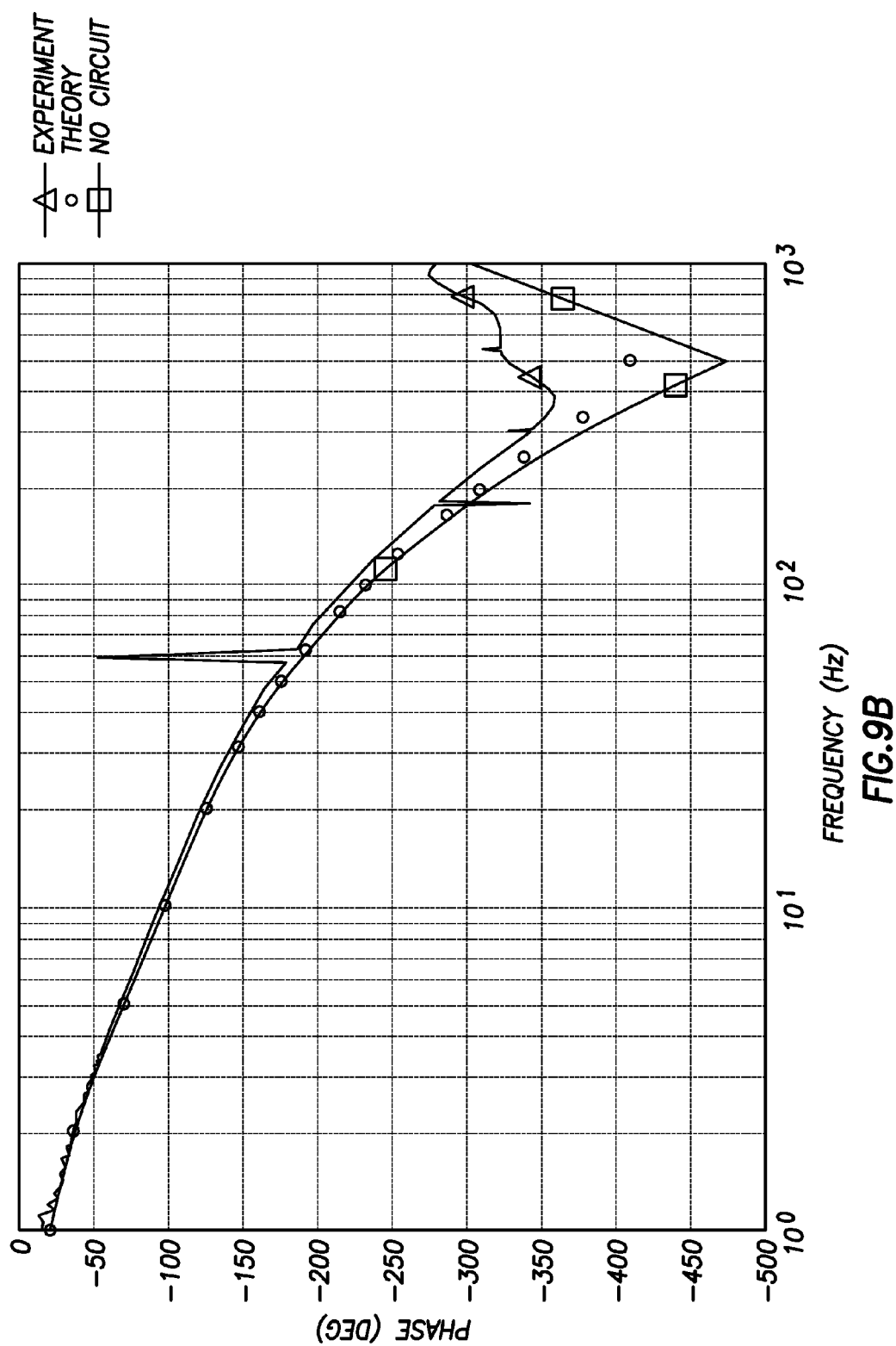
Figure 10A:
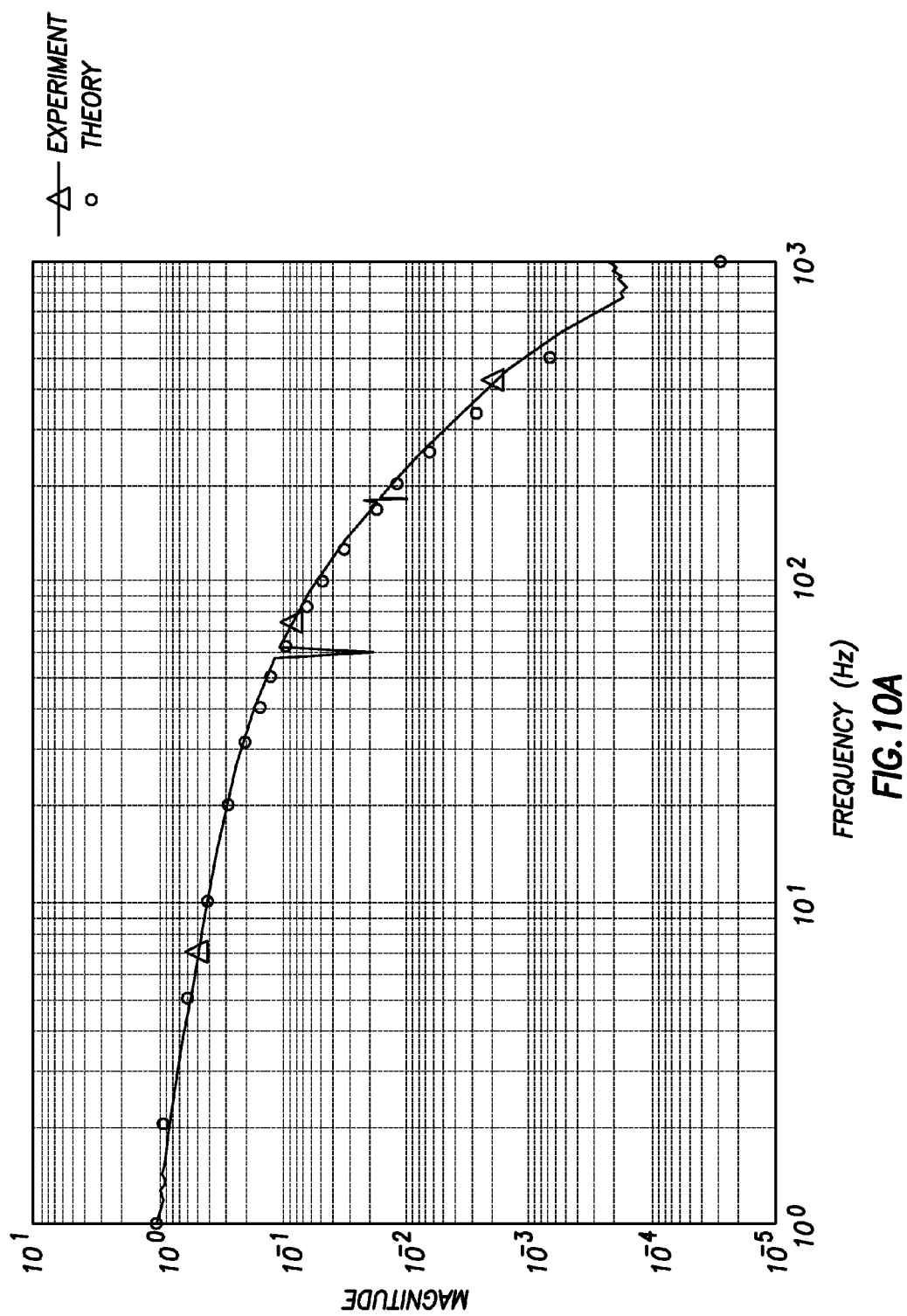
FIGS. 10A and 10B are exemplary graphs in which the measured and modeled casing attenuation factors are plotted for the feedback mode as a function of frequency for steel casing, FIG. 10A corresponding to the amplitude, and FIG. 10B corresponding to the phase.
Figure 10B:
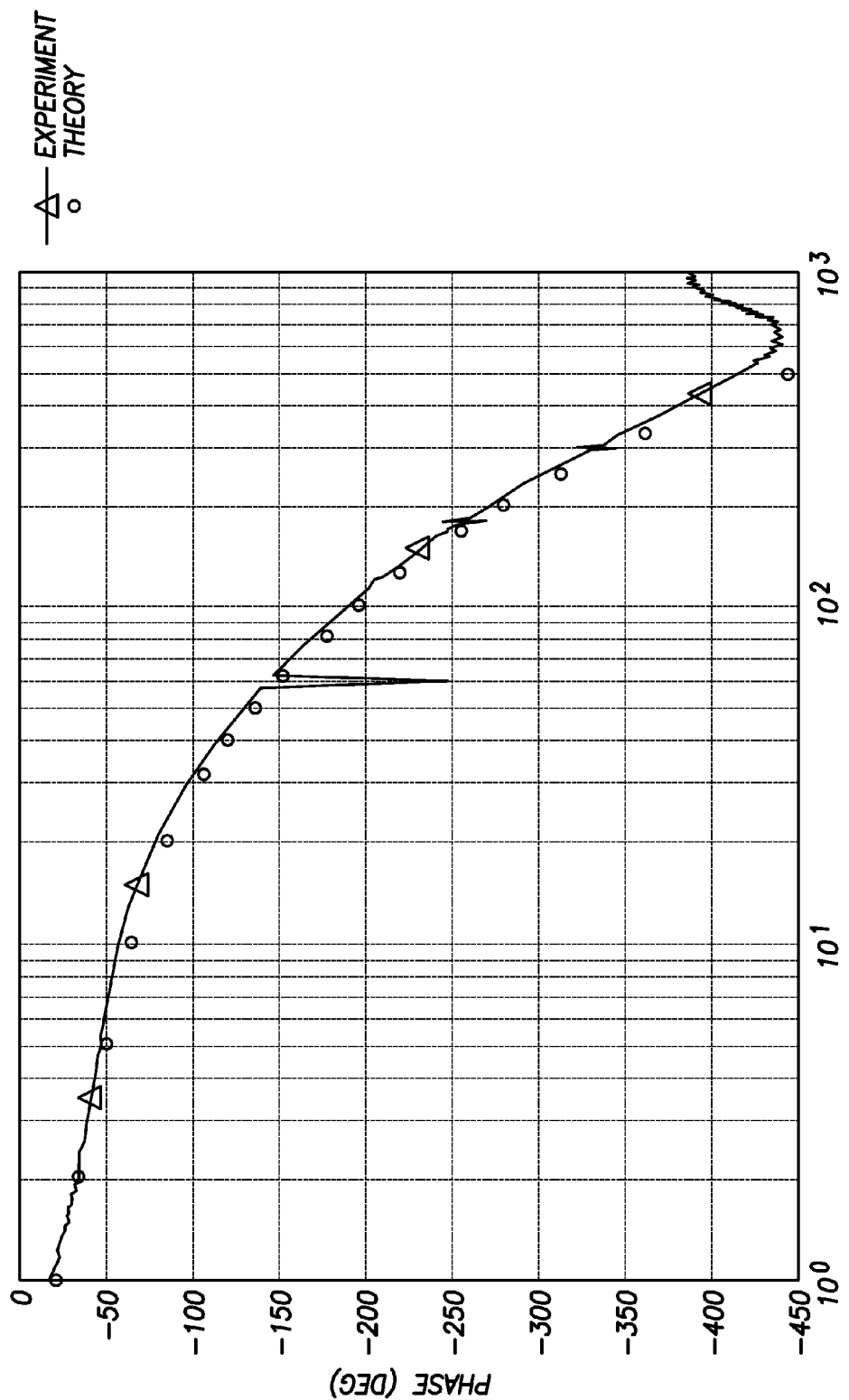

For the circuit model, there is nothing fundamentally different about steel casing and chromium casing. FIG. 9 shows the casing attenuation factors of the receiver in straight mode in steel casing. The comparable results for feedback mode are presented in FIG. 10. The results are plotted up to 1 kHz, which is well above the tool operating range due to the large loss in steel casing.

The above calculations use a conductivity of $4.3\times10^6$ S/m and a relative permeability of 78. The conductivity was measured with a 4-electrode resistivity device, and the permeability was obtained by matching modeling results to experimental measurements of the transfer function between a large solenoid wound about the casing and a winding on the surface of the casing.

If a logging tool is properly configured, one can measure the transimpedance between the feedback winding and the main winding by exciting the feedback coil and measuring the voltage on the main coil. One can also measure the current used to excite the feedback coil and simultaneously measure the voltage induced on the main coil. The ratio of this main coil voltage to the feedback coil current is the transimpedance between the feedback and main windings. The measured impedance of the main winding can be modeled by including all the circuit elements including winding inductance, resistance, stray capacitance, and a parallel resistance representing the core loss. An important question is whether this transimpedance measurement provides the same information as a measurement of the main coil, and the answer is yes if certain conditions are met.

The measurement of transimpedance grows out of a measurement that was originally implemented to test the integrity of a circuit. The receiver circuit is configured to excite the feedback coil and to measure the voltage on the main coil. This can be done with pulses at arbitrary frequencies. An anomalous reading under a known test environment indicates that something is wrong in the circuit. However, observations revealed the behavior of the tool to be significantly different in when operated in casing (i.e., rather than in air or an open hole), and also when the tool was placed near a casing centralizer or a collar. Thus, the transimpedance contains information about the casing.

Questions to be answered include: (1) how this transimpedance $Z_{MF}=V_{Main}/I_{Feedback}$ relates to the self impedance of the main winding $Z_M=V_{Main}/I_{main}$; and (2) under what conditions does the transimpedance provide the information needed to calculate the casing effect. A simple circuit that can be used to answer this question is the one shown in FIG. 5.

Figure 5:
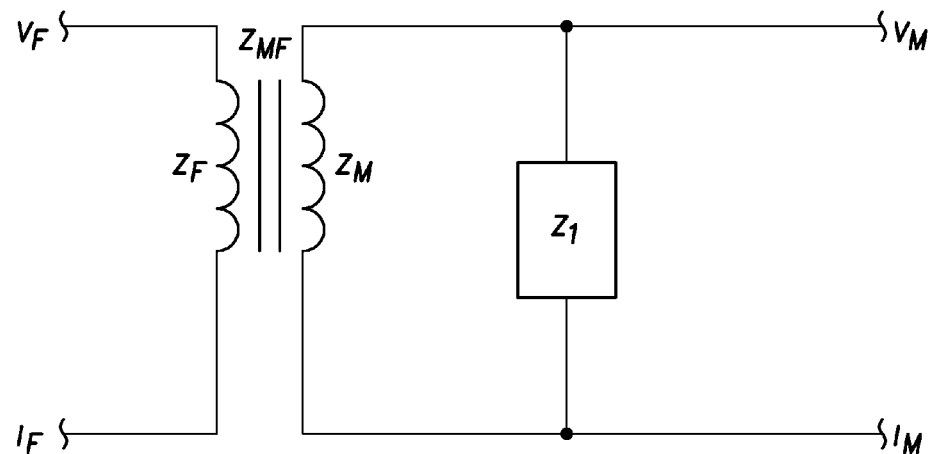
FIG. 5 shows an embodiment of a circuit model for transimpedance and impedance of an induction sensor with feedback windings.

FIG. 5 shows a simple inductor (the feedback winding) on the LHS (Left Hand Side) that is coupled inductively to the main winding. We can either excite the feedback coil with current $I_F$ and measure $V_M$, or we can excite the main coil and measure $I_M$ and $V_F$. In the trivial case in which $Z_1=\infty$, there is no current on the RHS (Right Hand Side), so:

Trans-impedances:

$$\frac{V_M}{I_F} = Z_{MF} \tag{13}$$

Impedance:

$$\frac{V_M}{I_M} = Z_M \tag{14}$$

Thus, one can measure either the pure transimpedance of the sensor or the impedance of the main winding. If the main and feedback windings are well coupled, as they typically are, then the transimpedance is simply the impedance times the turns ratio, $$Z_{MF} \approx \frac{N_F}{N_M} Z_M.$$

If $Z_1 \neq \infty$, current actually flows in the RHS. To add impedances in series and in parallel:

$$Z_S = Z_1 + Z_2 \tag{15}$$

$$Z_P = \frac{Z_1 Z_2}{Z_1 + Z_2}$$

When the RHS is excited, a voltage appears across the terminals on the right. When the LHS is excited, a voltage equal to $e=Z_{MF}I_F$ will appear in the circuit, just as the voltage from a far transmitter appears in FIGS. 2 and 3. This voltage drives a current $$I_{Coil} = \frac{e}{Z_M + Z_1}.$$

This current, in turn corresponds to a voltage on the RHS equal to $V_M = I_{coil}Z_1$. So the formulas for impedance and transimpedance become:

$$\frac{V_M}{I_M} = \left(\frac{Z_M Z_1}{Z_M + Z_1}\right) \quad (16)$$

$$\frac{V_M}{I_F} = \left(\frac{Z_{MF} Z_1}{Z_M + Z_1}\right) = \frac{N_F}{N_M}\frac{V_M}{I_M}$$

Thus, for this simple case, the transimpedance is simply a scaled version of the impedance. That is not, however, always the case.

Figure 6:
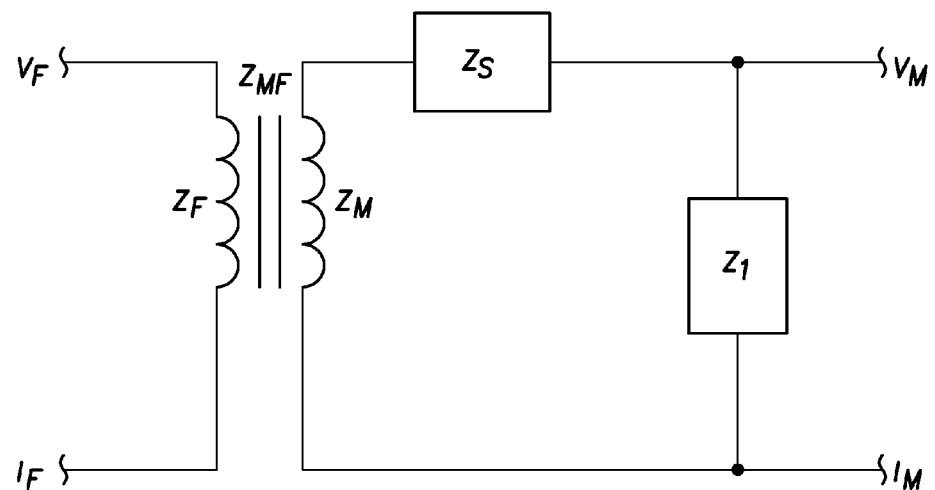
FIG. 6 shows the circuit model of FIG. 5, but also includes a series impedance $Z_s$ in the main winding.

For example, for the circuit of FIG. 5, one could add a circuit component with its impedance in series with the main coil. This could be a simple resistor, or it could be something more, as shown in FIG. 6. If the LHS of FIG. 6 is excited, the voltage induced in the coil is the same as it was above, but now:

$$I_{Coil} = \frac{e}{Z_M + Z_S + Z_1}$$

and equation 16 is replaced by:

$$\frac{V_M}{I_M} = \left(\frac{(Z_M + Z_S)Z_1}{Z_M + Z_S + Z_1}\right) \quad (17)$$

$$\frac{V_M}{I_F} = \left(\frac{Z_{MF} Z_1}{Z_M + Z_S + Z_1}\right)$$

In this slightly more complicated model, the impedance and transimpedance are not simple, scaled versions of each other. Nevertheless, either measurement provides equivalent information, so long as we can assume that $Z_{MF}$ and $Z_M$ are simple, scaled versions of each other.

The assumptions made to calculate the transimpedance of the senor are: (1) the main winding and the feedback winding are well-coupled; (2) the other circuit parameters are known or are measurable; and (3) any parallel impedance on the feedback side is large or known. The first assumption holds if the transimpedance of the main and feedback windings is simply related to the self-impedance of the main coil by turns ratio. If that is not true, then one cannot easily relate the feedback current to the voltage induced in the main coil. The degree of coupling is represented by the coupling coefficient $k_{MF}$, defined as:

$$k_{MF} = \left|\frac{Z_{MF}}{\sqrt{Z_M Z_F}}\right| \quad (18)$$

The value of $k_{MF}$ varies between 0 (no coupling) and 1 (perfect coupling). A calculation using a finite element code gave a coupling coefficient of 0.9998 for the tested sensor. The difference between this value and perfect coupling is beyond the accuracy of the code. It should be noted that the tight coupling is due to the presence of the high permeability magnetic core. Nearly all of the magnetic field from either the main or the feedback winding goes through the magnetic core. Without the core, the coupling coefficient is only 0.8829 and the assumption that the windings are well-coupled may not be valid.

Because the equations show that all the circuit parameters come into play in these results, that is the basis for the second assumption. While the components of the receiver circuit are known by design and precision components with low temperature coefficients can be used, some of the parameters, such as the resistance of the receiver coil, may need to be measured separately.

Finally, the third assumption is implicit in the equation $e = Z_{MF}I_F$, where it is assumed that all the current injected into the feedback winding actually goes through the coil and induces a voltage in the main coil, and none of it is lost in any parallel elements. As a practical matter, this means that the feedback coil is preferably operated far below its natural resonance frequency. Since the resonance frequency is given by $$f_{Resonance} = \frac{1}{2\pi\sqrt{LC}},$$

this will generally be true for the feedback winding. The inductance of the feedback is much smaller than the main winding, it decreases when operated in casing, and its stray capacitance is generally negligible compared to the main winding. Thus, for the typical frequency range of interest, operations should be performed far below the resonance frequency of the feedback winding. If there were significant parasitic elements on the feedback side, those would complicate the calculation, but it would still be possible to use the transimpedance measurement so long as those elements were known.

While the invention has been described with respect to a limited number of embodiments, those skilled in the art, having benefit of this disclosure, will appreciate that other embodiments can be envisioned that do not depart from the scope of the invention as disclosed herein. Accordingly, the scope of the invention shall be limited only by the attached claims.

What is claimed is:

1. A method to determine attenuation factors relating to an electromagnetic signal passing through a conductive material, comprising:
   providing a real sensor disposed adjacent to the material;
   passing an alternating current through the real sensor;
   measuring the impedance of the real sensor;
   modeling the impedance of the real sensor using the impedance of an ideal sensor and an equivalent circuit analysis of the real sensor;
   determining the attenuation factors by comparing the measured impedance to the modeled impedance;
   estimating the impedance of the ideal sensor using the measured impedance;
   modeling the impedance of the ideal sensor using numerical electromagnetic modeling; and determining attenuation factors for the ideal sensor by comparing the estimated impedance of the ideal sensor to the modeled impedance of the ideal sensor.

2. The method of claim 1, wherein the modeling is numerical electromagnetic modeling.

3. The method of claim 1, further comprising:
operating the real sensor in feedback mode; and
determining the attenuation factors using the attenuation factors for the ideal sensor and equivalent circuit modeling of transfer functions for the real sensor when operating in air and when operating adjacent to the conductive material.

4. The method of claim 1, wherein the real sensor includes a core having a magnetic permeability of at least $100\mu_r$.

5. The method of claim 1, wherein the circuit analysis accounts for the real sensor's detection circuit.

6. The method of claim 1, further comprising correcting survey data from crosswell, surface-to-borehole, and/or single-well induction logging using the attenuation factors.

7. The method of claim 6, wherein the correction is done in real-time or post-survey.

8. The method of claim 1, wherein the sensor operates in straight mode or in feedback mode.

9. A method to determine parameters of a conductive material, comprising:
providing a real sensor disposed adjacent to the material;
passing an alternating current through the real sensor;
measuring the impedance of the real sensor;
modeling the impedance of the real sensor using the impedance of an ideal sensor and a circuit analysis of the real sensor;
determining the parameters by comparing the measured impedance to the modeled impedance;
estimating the impedance of the ideal sensor using the measured impedance;
modeling the impedance of the ideal sensor using numerical electromagnetic modeling; and
determining idealized parameters by comparing the estimated impedance of the ideal sensor to the modeled impedance of the ideal sensor.

10. The method of claim 9, wherein the modeling is numerical electromagnetic modeling.

11. The method of claim 9, further comprising:
operating the real sensor in feedback mode; and
determining the parameters using the idealized parameters and equivalent circuit modeling of transfer functions for the real sensor when operating in air and when operating adjacent to the conductive material.

12. The method of claim 9, wherein the circuit analysis accounts for the real sensor's detection circuit.

13. A method to determine parameters of, or attenuation factors relating to an electromagnetic signal passing through, conductive material, comprising:
providing a real sensor disposed adjacent to the material;
passing an alternating current through the real sensor;
measuring the transimpedance of the real sensor;
relating the transimpedance of the real sensor to the actual impedance of the real sensor;
modeling the impedance of the real sensor using the impedance of an ideal sensor and a circuit analysis of the real sensor;
determining the parameters and/or the attenuation factors by comparing the measured impedance to the modeled impedance;
estimating the impedance of the ideal sensor using the measured impedance;
modeling the impedance of the ideal sensor using numerical electromagnetic modeling; and
determining idealized parameters and/or idealized attenuation factors by comparing the estimated impedance of the ideal sensor to the modeled impedance of the ideal sensor.

14. The method of claim 13, wherein the modeling is numerical electromagnetic modeling.

15. The method of claim 13, further comprising:
operating the real sensor in feedback mode; and
determining the parameters and/or the attenuation factors using the idealized parameters and/or the idealized attenuation factors and equivalent circuit modeling of transfer functions for the real sensor when operating in air and when operating adjacent to the conductive material.

16. A method to determine attenuation factors relating to an electromagnetic signal passing through a conductive material, comprising:
providing one or more real sensors, each real sensor being disposed adjacent to a uniform section of the material;
passing an alternating current through one of the one or more real sensors;
measuring the impedance of that real sensor at two or more frequencies;
modeling the impedance of that real sensor using the impedance of an ideal sensor and a circuit analysis of the real sensor;
determining the attenuation factors by comparing the measured impedance to the modeled impedance:
estimating the impedance of the ideal sensor using the measured impedance;
modeling the impedance of the ideal sensor using numerical electromagnetic modeling; and
determining attenuation factors for the ideal sensor by comparing the estimated impedance of the ideal sensor to the modeled impedance of the ideal sensor.

17. The method of claim 16, wherein the modeling is numerical electromagnetic modeling.

18. The method of claim 16, further comprising:
operating that real sensor in feedback mode; and
determining the attenuation factors using the attenuation factors for the ideal sensor and equivalent circuit modeling of transfer functions for that real sensor when operating in air and when operating adjacent to the conductive material.

19. The method of claim 16, wherein the passing current and measuring impedance is done for each of the one or more real sensors.

20. The method of claim 16, wherein each of the one or more real sensors operates in a feedback mode.

21. The method of claim 16, further comprising applying the attenuation factors to survey data.

22. The method of claim 16, further comprising constraining an inversion using the attenuation factors.

23. The method of claim 16, wherein at least one frequency is less than 2Ghz and at least one frequency is in a survey frequency range.

24. The method of claim 16, wherein the modeling includes a parasitic capacitance, a parallel resistance, a series resistance, or a combination of those.

25. The method of claim 16, wherein the material is casing and further comprising determining a casing effect by comparing the measured impedance to the modeled impedance.

* * * * *